(12) United States Patent
Ikeno et al.

(10) Patent No.: US 7,662,479 B2
(45) Date of Patent: Feb. 16, 2010

(54) LIQUID SILICONE RUBBER COATING COMPOSITION, CURTAIN AIR BAG, AND METHOD OF PRODUCING SAME

(75) Inventors: Masayuki Ikeno, Maebashi (JP); Tsutomu Nakamura, Annaka (JP); Hidenori Mizushima, Annaka (JP); Shigeru Ubukata, Takasaki (JP); Daichi Todoroki, Takasaki (JP); Takashi Tanaka, Sakai (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/181,682

(22) Filed: Jul. 29, 2008

(65) Prior Publication Data

US 2009/0033076 A1 Feb. 5, 2009

(30) Foreign Application Priority Data

Jul. 30, 2007 (JP) .............................. 2007-196932

(51) Int. Cl.
*B60C 1/00* (2006.01)
*B32B 9/04* (2006.01)
(52) U.S. Cl. ...................................... 428/447; 524/492
(58) Field of Classification Search ................. 428/447; 280/728.1, 730.2; 524/492; 427/331, 387
See application file for complete search history.

(56) References Cited

U.S. PATENT DOCUMENTS

| 4,742,103 | A | 5/1988 | Morita et al. |
| 5,296,298 | A | 3/1994 | Fujimoto et al. |
| 5,625,022 | A | 4/1997 | Onishi |
| 5,877,256 | A | 3/1999 | Nakamura et al. |
| 6,248,699 | B1 | 6/2001 | Subramanian et al. |
| 6,387,520 | B1 | 5/2002 | Fujiki et al. |
| 6,780,919 | B2 | 8/2004 | Ikeno et al. |
| 2006/0159935 | A1 | 7/2006 | Mizushima et al. |
| 2006/0177673 | A1 | 8/2006 | Ikeno et al. |
| 2007/0166555 | A1 | 7/2007 | Ikeno et al. |
| 2007/0281097 | A1 | 12/2007 | Ikeno et al. |
| 2007/0281564 | A1 | 12/2007 | Mizushima et al. |
| 2008/0194773 | A1 | 8/2008 | Wakioka et al. |

FOREIGN PATENT DOCUMENTS

| EP | 0 639 605 A2 | 2/1995 |
| EP | 0 735 100 A2 | 10/1996 |
| JP | 61-089268 | 5/1986 |
| JP | 4-178461 | 6/1992 |
| JP | 5-140459 | 6/1993 |
| JP | 8-269337 | 10/1996 |
| JP | 2001-287610 | 10/2001 |
| JP | 2002-138249 | 5/2002 |
| WO | 2005/108500 | 11/2005 |

*Primary Examiner*—Arti Singh-Pandey
(74) *Attorney, Agent, or Firm*—Oblon, Spivak, McClelland, Maier & Neustadt, L.L.P.

(57) ABSTRACT

A liquid silicone rubber coating composition that is ideal for forming a coating on an air bag is provided. The composition includes: (A) an organopolysiloxane containing two or more alkenyl groups bonded to silicon atoms within each molecule, (B) an organohydrogenpolysiloxane containing at least two silicon atom-bonded hydrogen atoms within each molecule, (C) an addition reaction catalyst, (D) a finely powdered silica with a specific surface area of at least 50 m$^2$/g, (E) an organosilicon compound containing an epoxy group and a silicon atom-bonded alkoxy group within each molecule, and (F) a compound represented by a general formula: Al(OH)(OCOR)$_2$ (wherein, R represents identical or different, unsubstituted or substituted monovalent hydrocarbon groups of 1 to 20 carbon atoms). Leakage of the inflator gas when the air bag is in an inflated state is suppressed, enabling production of an air bag that exhibits excellent sustainability of the inflation period.

18 Claims, No Drawings

LIQUID SILICONE RUBBER COATING COMPOSITION, CURTAIN AIR BAG, AND METHOD OF PRODUCING SAME

CROSS REFERENCE TO RELATED APPLICATION

This application claims priority to Japanese Patent Application No. 2007-196932, filed on Jul. 30, 2007.

BACKGROUND OF THE INVENTION

1. Field of the Invention

The present invention relates to a liquid silicone rubber coating composition that is ideal for producing air bags for vehicles and the like, wherein a film of a silicone rubber coating is formed on a fibrous fabric such as 6,6-nylon, 6-nylon or polyester. The present invention relates particularly to a liquid silicone rubber coating composition that is ideal for producing curtain air bags, which unlike the air bags installed for the driver's seat and passenger seat, are housed along the edge of the roof from the front pillar, and must be capable of maintaining an inflated state for a certain period of time in order to protect the region around the head and prevent people being flung from the vehicle during a collision or rollover of the vehicle. The present invention also relates to a curtain air bag having a silicone rubber coating layer composed of a cured product of the above composition, and a method of producing such an air bag.

2. Description of the Prior Art

Conventional air bag silicone rubber compositions used for forming a rubber coating on a fibrous surface include the compositions described below. For example, patent reference 1 discloses a liquid silicone rubber coating composition for an air bag that exhibits excellent adhesion to base fabrics, prepared by adding an inorganic filler, an organopolysiloxane resin, and an epoxy group-containing organosilicon compound to an addition curable composition. Patent reference 2 discloses a liquid silicone rubber coating composition for an air bag that develops excellent adhesion to base fabrics upon heat curing for a short period of time, prepared by adding an inorganic filler, an organopolysiloxane resin, an organotitanium compound, and an alkyl silicate or alkyl polysilicate to an addition curable composition. Patent reference 3 discloses a silicone rubber coating composition for an air bag that has excellent thin-film coating properties, in which the viscosity of a vinyl group-containing organopolysiloxane is restricted to not more than 8,000 centipoise. Patent reference 4 discloses a liquid silicone rubber composition for coating purposes that is used in the production of a silicone rubber-coated base fabric having reduced tack, and is prepared by adding a wet silica with an average BET specific surface area within a range from 150 to 250 m$^2$/g and an average particle size of not more than 20 µm to a rubber coating composition.

However, when these compositions are used in curtain air bag applications, none of the compositions is able to satisfactorily suppress leakage of the inflator gas to enable the inflation time to be sustained for a satisfactory period.

Addition curable compositions containing an aluminum compound related to that of the present invention are disclosed in patent references 5 to 7. However, none of these references discloses the aluminum compound used in the present invention.

[Patent Reference 1] U.S. Pat. No. 5,877,256
[Patent Reference 2] JP 2002-138249 A
[Patent Reference 3] JP 2001-287610 A
[Patent Reference 4] U.S. Pat. No. 6,387,520
[Patent Reference 5] U.S. Pat. No. 4,742,103
[Patent Reference 6] JP 4-178461 A
[Patent Reference 7] U.S. Pat. No. 5,625,022

SUMMARY OF THE INVENTION

The present invention takes the above circumstances into consideration, with an object of providing a liquid silicone rubber coating composition that can be used to produce an air bag that is capable of suppressing leakage of the inflator gas with the air bag in an inflated state, and exhibits excellent sustainability of the inflation period. Another object of the present invention is to provide a curtain air bag having a silicone rubber coating layer composed of a cured product of the above composition provided on at least one surface of the base fabric, and a method of producing such a curtain air bag.

As a result of intensive investigation aimed at achieving the above objects, the inventors of the present invention discovered that when a cured product of a liquid silicone rubber coating composition, comprising: (A) an organopolysiloxane containing two or more alkenyl groups bonded to silicon atoms within each molecule, (B) an organohydrogenpolysiloxane containing at least two silicon atom-bonded hydrogen atoms within each molecule, (C) an addition reaction catalyst, preferably (D) a finely powdered silica with a specific surface area of at least 50 m$^2$/g, (E) an organosilicon compound containing an epoxy group and a silicon atom-bonded alkoxy group within each molecule, and (F) a monohydroxydiacyloxy aluminum compound was used as the silicone rubber coating layer of a curtain air bag, leakage of the inflator gas could be suppressed, enabling inflation of the curtain air bag to be sustained for a certain period, and they were therefore able to complete the present invention.

Accordingly, a first aspect of the present invention provides a liquid silicone rubber coating composition, comprising:

(A) 100 parts by mass of an organopolysiloxane containing two or more alkenyl groups bonded to silicon atoms within each molecule, (B) an organohydrogenpolysiloxane containing at least two silicon atom-bonded hydrogen atoms within each molecule, in sufficient quantity that a number of silicon atom-bonded hydrogen atoms within the composition is within a range from 1 to 10 per silicon atom-bonded alkenyl group within the component (A), and a molar ratio of a number of silicon atom-bonded hydrogen atoms within the component (B) relative to a total number of silicon atom-bonded hydrogen atoms within the entire composition is within a range from 0.5 to 1, (C) an effective quantity of an addition reaction catalyst, (D) 0 to 50 parts by mass of a finely powdered silica with a specific surface area of at least 50 m$^2$/g, (E) 0.1 to 10 parts by mass of an organosilicon compound containing an epoxy group and a silicon atom-bonded alkoxy group within each molecule, and (F) 0.01 to 5 parts by mass of a compound represented by a general formula (3) shown below:

$$Al(OH)(OCOR)_2 \qquad (3)$$

(wherein, R represents identical or different, unsubstituted or substituted monovalent hydrocarbon groups of 1 to 20 carbon atoms).

A second aspect of the present invention provides a cured product obtained by curing the above composition.

A third aspect of the present invention provides a curtain air bag, comprising:

a substrate composed of a fibrous fabric, and a silicone rubber coating layer formed from a cured product of the above composition, wherein the silicone rubber coating layer is formed on at least one surface of the substrate.

A fourth aspect of the present invention provides a method of producing the above curtain air bag, comprising the steps of:

applying the above composition to at least one surface of a substrate composed of a fibrous fabric, and curing the composition, thereby forming a silicone rubber coating layer formed from a cured product of the composition on at least one surface of the substrate.

According to the present invention, a liquid silicone rubber coating composition is obtained that is capable of forming a curtain air bag with excellent gas tightness. A curtain air bag having a substrate composed of a fibrous fabric, and a silicone rubber coating layer formed from a cured product of the above composition, wherein the silicone rubber coating layer is formed on at least one surface of the substrate, suppresses leakage of the inflator gas, enabling the inflation time to be sustained for a satisfactory period.

DETAILED DESCRIPTION OF THE PREFERRED EMBODIMENTS

A more detailed description of the present invention is presented below. In the present invention, viscosity values refer to values measured using a rotational viscometer.

<Liquid Silicone Rubber Coating Composition>

A liquid silicone rubber coating composition of the present invention comprises the components (A) through (F) described below, and is a liquid at room temperature (defined as 25° C., this also applies below). A detailed description of each of these components is presented below.

[Component (A)]

The organopolysiloxane of the component (A) contains two or more alkenyl groups bonded to silicon atoms within each molecule, and functions as the base polymer of the composition of the present invention. The organopolysiloxane of the component (A) may be either a single compound, or a combination of two or more different compounds.

Examples of the molecular structure of the component (A) include straight-chain, cyclic, branched-chain, and three dimensional network structures, although a straight-chain diorganopolysiloxane in which the principal chain is composed essentially of repeating diorganosiloxane units and both molecular chain terminals are blocked with triorganosiloxy units is preferred (wherein, these organo groups may include alkenyl groups). Furthermore, in those cases where the molecular structure of the organopolysiloxane of the component (A) is either a straight chain or a branched chain, the positions within the organopolysiloxane molecule of the silicon atoms to which the alkenyl groups are bonded may be either one of, or both, the molecular chain terminals and positions within the molecular chain (namely, non-terminal positions). The component (A) is most preferably a straight-chain diorganopolysiloxane containing alkenyl groups bonded to at least the silicon atoms at both molecular chain terminals.

Examples of the alkenyl groups bonded to silicon atoms within the component (A) include identical or different, unsubstituted or substituted alkenyl groups, typically containing from 2 to 8 carbon atoms, and preferably from 2 to 4 carbon atoms. Specific examples include a vinyl group, allyl group, propenyl group, isopropenyl group, isobutenyl group, butenyl group, pentenyl group, hexenyl group, cyclohexenyl group or heptenyl group, and of these, a vinyl group is particularly preferred.

The quantity of alkenyl groups bonded to silicon atoms within the component (A), relative to the total number of monovalent organic groups bonded to silicon atoms, is preferably within a range from 0.001 to 10 mol %, and is even more preferably from approximately 0.01 to 5 mol %.

Examples of the monovalent organic groups bonded to silicon atoms within the component (A) other than the above alkenyl groups include identical or different, unsubstituted or substituted monovalent hydrocarbon groups that contain no aliphatic unsaturated bonds, and typically contain from 1 to 12 carbon atoms, and preferably from 1 to 10 carbon atoms. Examples of the substituted monovalent hydrocarbon groups include halogen-substituted groups. Specific examples of these organic groups include alkyl groups such as a methyl group, ethyl group, propyl group, butyl group, pentyl group, hexyl group, cyclohexyl group or heptyl group; aryl groups such as a phenyl group, tolyl group, xylyl group or naphthyl group; aralkyl groups such as a benzyl group or phenethyl group; and halogenated alkyl groups such as a chloromethyl group, 3-chloropropyl group or 3,3,3-trifluoropropyl group. Of these, a methyl group or phenyl group is particularly preferred.

The viscosity at 25° C. of the component (A) is preferably within a range from 100 to 500,000 mPa·s, and is even more preferably within a range from 300 to 100,000 mPa·s. A viscosity value within this range yields more favorable handling for the resulting composition, as well as superior physical properties for the resulting silicone rubber.

Preferred examples of the component (A) include organopolysiloxanes represented by an average composition formula (1) shown below:

$$R^1_a SiO_{(4-a)/2} \qquad (1)$$

(wherein, $R^1$ represents identical or different, unsubstituted or substituted monovalent hydrocarbon groups of 1 to 10 carbon atoms, and preferably 1 to 8 carbon atoms, and a represents a number within a range from 1.5 to 2.8, preferably from 1.8 to 2.5, and even more preferably from 1.95 to 2.05, provided that 0.001 to 10 mol %, and preferably from 0.01 to 5 mol %, of all the $R^1$ groups are alkenyl groups).

Specific examples of the $R^1$ groups include the alkenyl groups listed above as examples of the alkenyl groups bonded to silicon atoms within the component (A), and the organic groups listed above as examples of the monovalent organic groups other than the alkenyl groups bonded to silicon atoms within the component (A).

Specific examples of the organopolysiloxane of the component (A) include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, dimethylpolysiloxane with both molecular chain terminals blocked with divinylmethylsiloxy groups, copolymers of dimethylsiloxane and methylvinylsiloxane with both molecular chain terminals blocked with divinylmethylsiloxy groups, dimethylpolysiloxane with both molecular chain terminals blocked with trivinylsiloxy groups, copolymers of dimethylsiloxane and methylvinylsiloxane with both molecular chain terminals blocked with trivinylsiloxy groups, organosiloxane copolymers composed of siloxane units represented by the formula $R^2_3SiO_{0.5}$, siloxane units represented by the formula $R^2_2R^3SiO_{0.5}$, siloxane units represented by the formula $R^2_2SiO$, and siloxane units represented by the formula $SiO_2$, organosiloxane copolymers composed of siloxane units represented by the formula $R^2_3SiO_{0.5}$, siloxane units represented by the formula $R^2_2R^3SiO_{0.5}$, and siloxane units represented by the formula $SiO_2$, organosiloxane copolymers composed of siloxane units represented by the formula $R^2_2R^3SiO_{0.5}$, siloxane units represented by the formula $R^2_2SiO$, and siloxane units represented by the formula $SiO_2$, organosiloxane copolymers composed of siloxane units represented by the formula $R^2R^3SiO$, and siloxane units represented by the formula $R^2SiO_{1.5}$ or siloxane units represented by the formula $R^3SiO_{1.5}$, and mixtures of two or more of the above organopolysiloxanes.

The groups $R^2$ within the above formulas represent identical or different, unsubstituted or substituted monovalent hydrocarbon groups that contain no aliphatic unsaturated bonds, and typically contain from 1 to 12 carbon atoms, and preferably from 1 to 10 carbon atoms. Specific examples of these R groups include alkyl groups such as a methyl group, ethyl group, propyl group, butyl group, pentyl group, hexyl group, cyclohexyl group or heptyl group; aryl groups such as a phenyl group, tolyl group, xylyl group or naphthyl group; aralkyl groups such as a benzyl group or phenethyl group; and halogenated alkyl groups such as a chloromethyl group, 3-chloropropyl group or 3,3,3-trifluoropropyl group. Furthermore, the groups $R^3$ in the above formulas represent identical or different, unsubstituted or substituted alkenyl groups, typically containing from 2 to 8 carbon atoms, and preferably from 2 to 4 carbon atoms, and specific examples include a vinyl group, allyl group, butenyl group, pentenyl group, hexenyl group or heptenyl group.

[Component (B)]

The organohydrogenpolysiloxane of the component (B) functions as a cross-linking agent by undergoing a hydrosilylation addition reaction with the component (A). The organohydrogenpolysiloxane of the component (B) may be either a single compound, or a combination of two or more different compounds. There are no particular restrictions on the molecular structure of the component (B), and any of the conventionally produced organohydrogenpolysiloxanes, including straight-chain, cyclic, branched-chain and three dimensional network (resin-like) structures may be used.

The organohydrogenpolysiloxane of the component (B) contains at least two (typically from 2 to 300), and preferably three or more (typically from 3 to 200, and preferably from approximately 3 to 100) silicon atom-bonded hydrogen atoms (namely, hydrosilyl groups or SiH groups) within each molecule. In those cases where the organohydrogenpolysiloxane of the component (B) has a straight-chain structure, these SiH groups may exist solely at the molecular chain terminals, solely at positions within the molecular chain (namely, non-terminal positions of the molecular chain), or at both of these positions.

The number of silicon atoms within each molecule of the component (B) (the polymerization degree) is preferably within a range from 2 to 300, even more preferably from 3 to 200, and is most preferably from approximately 4 to 150. The component (B) is preferably a liquid at room temperature (25° C.), and the viscosity of the component (B) at 25° C. is preferably within a range from 0.1 to 1,000 mPa·s, and is even more preferably from approximately 0.5 to 500 mPa·s.

Examples of the component (B) include organohydrogenpolysiloxanes represented by an average composition formula (2) shown below.

$$R^4_bH_cSiO_{(4-b-c)/2} \quad (2)$$

(wherein, $R^4$ represents identical or different, unsubstituted or substituted silicon atom-bonded monovalent hydrocarbon groups that contain no aliphatic unsaturated bonds, and typically contain from 1 to 10 carbon atoms, and preferably from 1 to 8 carbon atoms, b and c represent positive numbers that preferably satisfy $0.7 \leq b \leq 2.1$, $0.001 \leq c \leq 1.0$ and $0.8 \leq b+c \leq 3.0$, and even more preferably satisfy $1.0 \leq b \leq 2.0$, $0.01 \leq c \leq 1.0$ and $1.5 \leq b+c \leq 2.5$)

Examples of the $R^4$ groups include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group or decyl group; aryl groups such as a phenyl group, tolyl group, xylyl group or naphthyl group; aralkyl groups such as a benzyl group, phenylethyl group or phenylpropyl group; and groups in which either a portion of, or all of, the hydrogen atoms within the above hydrocarbon groups have been substituted with a halogen atom such as a fluorine atom, bromine atom or chlorine atom, such as a chloromethyl group, chloropropyl group, bromoethyl group or trifluoropropyl group. The $R^4$ groups are preferably alkyl groups and/or aryl groups, and a methyl group and phenyl group are particularly desirable.

Specific examples of the component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, copolymers of dimethylsiloxane, methylhydrogensiloxane and methylphenylsiloxane with both terminals blocked with trimethylsiloxy groups, copolymers of dimethylsiloxane, methylhydrogensiloxane and diphenylsiloxane with both terminals blocked with trimethylsiloxy groups, methylhydrogenpolysiloxane with both terminals blocked with dimethylhydrogensiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of dimethylsiloxane and methylphenylsiloxane with both terminals blocked with dimethylhydrogensiloxy groups, copolymers of dimethylsiloxane and diphenylsiloxane with both terminals blocked with dimethylhydrogensiloxy groups, methylphenylpolysiloxane with both terminals blocked with dimethylhydrogensiloxy groups, diphenylpolysiloxane with both terminals blocked with dimethylhydrogensiloxy groups, organohydrogenpolysiloxanes in which a portion of, or all of, the methyl groups in each of the above compounds have been substituted with other alkyl groups such as ethyl groups or propyl groups, organosiloxane copolymers composed of siloxane units represented by the formula $R^4_3SiO_{0.5}$, siloxane units represented by the formula $R_{42}HSiO_{0.5}$, and siloxane units represented by the formula $SiO_2$, organosiloxane copolymers composed of siloxane units represented by the formula $R^4{}_2HSiO_{0.5}$ and siloxane units represented by the formula $SiO_2$, organosiloxane copolymers composed of siloxane units represented by the formula $R^4HSiO$ and siloxane units represented by either one of, or both, the formulas $R^4SiO_{1.5}$ and $HSiO_{1.5}$, and mixtures of two or more of the above organopolysiloxanes. In the above formulas, $R^4$ is as defined above.

In the present invention, the component (E) described below may also contain hydrogen atoms bonded to silicon atoms. Furthermore, organohydrogenpolysiloxanes other than the component (B) and the component (E) may also be added to the composition as optional components. In such cases, the total number of SiH groups contained within the combination of the component (B), the component (E), and any optional organohydrogenpolysiloxanes other than the component (B) and the component (E) is within a range from 1 to 10, and preferably from 1 to 5, per silicon atom-bonded alkenyl group within the component (A). If the total number of SiH groups within the entire composition per silicon atom-bonded alkenyl group within the component (A) is less than 1, then the resulting composition may not cure satisfactorily. In contrast, if the total number of SiH groups within the entire composition per silicon atom-bonded alkenyl group within the component (A) exceeds 10, then the resulting silicone rubber tends to be prone to a dramatic deterioration in heat resistance. Moreover, the blend quantity of the component (B) is preferably sufficient that the molar ratio of the number of SiH groups within the component (B) relative to the total number of SiH groups within the entire composition is within a range from 0.5 to 1, and most preferably from 0.7 to 1.

In those cases where the composition contains no compounds containing silicon atom-bonded hydrogen atoms other than the component (B), the blend quantity of the component (B) is sufficient that the number of silicon atom-bonded hydrogen atoms within the component (B) per silicon atom-bonded alkenyl group within the component (A) is typically within a range from 1 to 10, and is preferably from 1 to 5. If the blend quantity of the component (B) is such that the number of silicon atom-bonded hydrogen atoms within the component (B) per silicon atom-bonded alkenyl group within the component (A) is less than 1, then the resulting composition may not cure satisfactorily. In contrast, if the blend quantity is such that the number of silicon atom-bonded hydrogen atoms within the component (B) per silicon atom-bonded alkenyl group within the component (A) exceeds 10, then the resulting silicone rubber tends to be prone to a dramatic deterioration in heat resistance.

[Component (C)]

The addition reaction catalyst of the component (C) may be any catalyst that is capable of promoting the hydrosilylation addition reaction between the silicon atom-bonded alkenyl groups within the component (A) and the SiH groups within the component (B). The component (C) may use either a single catalyst, or a combination of two or more different catalysts. Examples of the component (C) include platinum-group metals such as platinum, palladium and rhodium, and platinum-group metal compounds such as chloroplatinic acid, alcohol-modified chloroplatinic acid, coordination compounds of chloroplatinic acid with olefins, vinylsiloxane or acetylene compounds, tetrakis(triphenylphosphine)palladium and chlorotris(triphenylphosphine)rhodium, and of these, platinum compounds are particularly preferred.

The blend quantity of the component (C) need only be sufficient to be effective as an addition reaction catalyst, and a preferred quantity, calculated as the mass of the catalytic metal element relative to the combined mass of the components (A) and (B), is within a range from 1 to 500 ppm, with quantities from 10 to 100 ppm being particularly desirable. Provided the blend quantity is within this range, the addition reaction can be satisfactorily accelerated, curing occurs favorably, and the rate of the addition reaction can be increased easily by increasing the blend quantity of the catalyst, which is desirable from an economic viewpoint.

[Component (D)]

The finely powdered silica of the component (D), which is used when required as an optional component in the present invention, functions as a reinforcing agent. In other words, the component (D) imparts a high tear strength to the cured product of the composition of the present invention. Accordingly, by using the finely powdered silica of the component (D) as a reinforcing agent, a coating film with superior tear strength properties can be formed. The finely powdered silica of the component (D) typically has a specific surface area of at least 50 $m^2/g$, and this value is preferably within a range from 50 to 400 $m^2/g$, and even more preferably from 100 to 300 $m^2/g$. Provided the specific surface area is within this range, superior tear strength properties can be imparted to the cured product. The specific surface area is measured using the BET method. The component (D) may use either a single material, or a combination of two or more different materials.

Provided the specific surface area is within the range specified above, the finely powdered silica of the component (D) can employ known silica materials typically used as reinforcing fillers within conventional silicone rubbers, and examples include both fumed silica and precipitated silica materials.

These finely powdered silica materials may be used as is, although in order to impart a superior level of flowability to the composition of the present invention, are preferably used in the form of a hydrophobic finely powdered silica, wherein the surface of the silica has undergone a hydrophobic treatment with an organosilicon compound, including a methylchlorosilane such as trimethylchlorosilane, dimethyldichlorosilane, or methyltrichlorosilane; a dimethylpolysiloxane; or a hexaorganodisilazane such as hexamethyldisilazane, divinyltetramethyldisilazane, or dimethyltetravinyldisilazane.

The blend quantity of the component (D) must be not more than 50 parts by mass (namely, from 0 to 50 parts by mass) per 100 parts by mass of the organopolysiloxane of the component (A). If the blend quantity exceeds 50 parts by mass, then the flowability of the composition may deteriorate, causing a worsening of the coating workability. The blend quantity is preferably within a range from 0.1 to 50 parts by mass, even more preferably from 1 to 50 parts by mass, and is most preferably from 5 to 40 parts by mass. If the blend quantity is within this range, then a particularly high level of tear strength can be more readily imparted to the cured product of the composition of the present invention.

[Component (E)]

The component (E) may use any organosilicon compound, provided the compound contains an epoxy group and a silicon atom-bonded alkoxy group (for example, an alkoxysilyl group such as a trialkoxysilyl group, organodialkoxysilyl group or diorganoalkoxysilyl group) within each molecule. From the viewpoint of achieving superior adhesion, an organosilicon compound containing at least one epoxy group and at least two silicon atom-bonded alkoxy groups (for example, at least one organodialkoxysilyl group), and preferably containing three or more silicon atom-bonded alkoxy groups (for example, at least one trialkoxysilyl group) is preferred, and examples of these preferred compounds include silanes containing at least one epoxy group and at least two, and preferably three or more, silicon atom-bonded alkoxy groups, and cyclic or straight-chain siloxanes containing from 2 to 30 silicon atoms, and preferably from 4 to 20 silicon atoms, and also containing at least one epoxy group and at least two silicon atom-bonded alkoxy groups. The component (E) may use either a single compound, or a combination of two or more different compounds.

The epoxy group is preferably bonded to a silicon atom in the form of a glycidoxyalkyl group such as a glycidoxypropyl group; or an epoxy group-containing cyclohexylalkyl group such as a 2,3-epoxycyclohexylethyl group or 3,4-epoxycyclohexylethyl group. The silicon atom-bonded alkoxy group is bonded to a silicon atom, and preferably forms a trialkoxysilyl group such as a trimethoxysilyl group or triethoxysilyl group; or an alkyldialkoxysilyl group such as a methyldimethoxysilyl group, ethyldimethoxysilyl group, methyldiethoxysilyl group, or ethyldiethoxysilyl group.

Furthermore, besides the epoxy group and silicon atom-bonded alkoxy group within each molecule, the component (E) may also include other functional groups, including at least one functional group selected from the group consisting of alkenyl groups such as a vinyl group, a (meth)acryloyloxy group, and a hydrosilyl group (SiH group).

Examples of the organosilicon compound of the component (E) include the organosilicon compounds represented by chemical formulas shown below, as well as mixtures of two or more of these compounds, and partial hydrolysis-condensation products of one or more of these compounds.

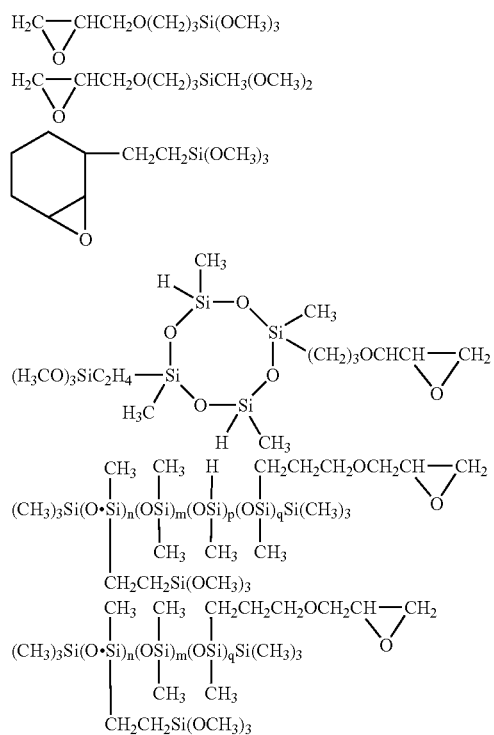

(wherein, n is an integer from 1 to 10, m is an integer from 0 to 100, and preferably an integer from 0 to 20, p is an integer from 1 to 100, and preferably an integer from 1 to 20, and q is an integer from 1 to 10) p The blend quantity of the component (E) is typically within a range from 0.1 to 10 parts by mass, and preferably from 0.1 to 5 parts by mass, per 100 parts by mass of the component (A). If this blend quantity is less than 0.1 parts by mass, then the resulting composition may not exhibit adequate self-adhesiveness. In contrast, if the blend quantity exceeds 10 parts by mass, then the physical properties of the resulting cured product are prone to deterioration.

[Component (F)]

The component (F) is an organoaluminum compound represented by a general formula (3) shown below:

$$Al(OH)(OCOR)_2 \qquad (3)$$

(wherein, R represents identical or different, unsubstituted or substituted monovalent hydrocarbon groups of 1 to 20 carbon atoms), namely a monohydroxydiacyloxy aluminum compound, and is used to impart a high degree of gas tightness to the resulting curtain air bag. The component (F) may use either a single compound, or a combination of two or more different compounds.

In the above formula, R represents identical or different, unsubstituted or substituted monovalent hydrocarbon groups of 1 to 20 carbon atoms, and preferably from 1 to 8 carbon atoms. Specific examples of R include alkyl groups of 1 to 20 carbon atoms, and preferably from 1 to 8 carbon atoms such as a methyl group, ethyl group, propyl group, isopropyl group, butyl group, isobutyl group, tert-butyl group, pentyl group, hexyl group, cyclohexyl group, heptyl group, 1-ethylpentyl group, octyl group, 2-ethylhexyl group, nonyl group, decyl group, dodecyl group, heptadecyl group and stearyl group.

Specific examples of the component (F) include the compounds shown below.

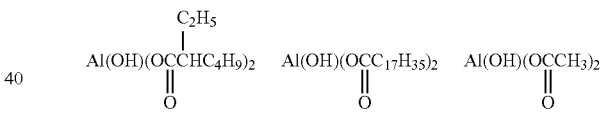

The blend quantity of the component (F) is typically within a range from 0.01 to 5 parts by mass, and is preferably from 0.1 to 2 parts by mass, per 100 parts by mass of the component (A). If this blend quantity is less than 0.01 parts by mass, then the gas tightness of the curtain air bag tends to deteriorate. In contrast, if the blend quantity exceeds 5 parts by mass, then the heat resistance of the resulting cured product tends to deteriorate.

[Other Components]

In addition to the components (A) through (F) described above, other optional components may also be added to the composition of the present invention, provided these optional components do not impair the objects of the present invention. Specific examples of these other components include those described below. These other components can be used either alone, or in combinations of two or more different materials.

Reaction Retarders

A reaction retarder may be any compound that exhibits an inhibiting effect on the curing reaction promoted by the addition reaction catalyst of the aforementioned component (C), and conventional reaction retarders can be used. Specific examples of the retarder include phosphorus-containing compounds such as triphenylphosphine; nitrogen-containing compounds such as tributylamine, tetramethylethylenediamine and benzotriazole; sulfur-containing compounds; acetylene-based compounds such as acetylene alcohols; compounds that contain two or more alkenyl groups; hydroperoxy compounds; and maleic acid derivatives.

The size of the curing inhibiting effect provided by the reaction retarder varies depending on the chemical structure of the reaction retarder, and consequently the quantity added of the reaction retarder is preferably adjusted to the most appropriate quantity for the particular reaction retarder being used. By using the most appropriate quantity of the reaction retarder, a composition with superior long term storage stability at room temperature and superior curability can be obtained.

Inorganic Fillers

Examples of inorganic fillers include inorganic fillers such as crystalline silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; fillers in which the above types of inorganic fillers have undergone a hydrophobic surface treatment with an organosilicon compound such as an organoalkoxysilane compound, organochlorosilane compound, organosilazane compound or low molecular weight siloxane compound; silicone rubber powders; and silicone resin powders.

Other Components

Examples of other components include, for example, organopolysiloxanes containing one silicon atom-bonded hydrogen atom within each molecule but containing no other functional groups, organopolysiloxanes containing one silicon atom-bonded alkenyl group within each molecule but containing no other functional groups, non-functional organopolysiloxanes containing no silicon atom-bonded hydrogen atoms, no silicon atom-bonded alkenyl groups, and no other functional groups, as well as organic solvents, creep hardening prevention agents, plasticizers, thixotropic imparting agents, pigments, dyes, and moldproofing agents.

[Method of Preparation]

The liquid silicone rubber coating composition of the present invention can be prepared by mixing the above components together in accordance with normal methods.

[Air Bags]

A liquid silicone rubber coating composition obtained in this manner is particularly suited to the production of curtain air bags, which are housed along the edge of the roof from the front pillar, and must be capable of maintaining an inflated state for a certain period of time in order to protect the region around the head and prevent people being flung from the vehicle during a collision or rollover of the vehicle.

In the present invention, examples of the air bags, and particularly curtain air bags, on which a silicone rubber coating layer composed of a cured product of the above composition may be formed include air bags of conventional construction, and specific examples include air bags in which a woven fabric of any of various synthetic fibers such as 6,6-nylon, 6-nylon, polyester fiber, aramid fiber, any of the various polyamide fibers, or any of the various polyester fibers is used as the base fabric, two sheets of this plain base fabric that have been rubber-coated on the inside surfaces are bonded together with an adhesive applied around the periphery of the sheets, and the adhesive layer is then stitched (hereafter referred to as plain fabric air bags), and woven air bags in which an aforementioned woven fabric is used as the base fabric, and the bag portion is formed by weaving.

The silicone rubber coating layer can be formed by applying the aforementioned liquid silicone rubber coating composition to at least one surface of, and preferably to only one surface of, the substrate composed of a fibrous fabric, and then conducting curing by, for example, performing heating inside a hot air dying oven. The silicone rubber-coated base fabric for a curtain air bag obtained in this manner can then be used to produce a curtain air bag. In this manner, the composition of the present invention can be used in the production of curtain air bags, and more specifically, can be used for forming a silicone rubber coating layer on at least one surface of the substrate used in producing the curtain air bags.

Examples of the substrate composed of a fibrous fabric include substrates that use any of the aforementioned synthetic fiber woven fabrics as a base fabric. Furthermore, conventional methods can be employed as the method used for coating the above composition onto this substrate, and the thickness of the coating layer (or the quantity of the composition applied to the surface) is preferably within a range from 10 to 150 $g/m^2$, even more preferably from 15 to 80 $g/m^2$, and is most preferably from 20 to 60 $g/m^2$.

The coating composition of the present invention can be cured under conventional curing conditions using conventional curing methods. Specifically, the composition can be cured, for example, by heating at a temperature of 120 to 180° C. for a period of 1 to 10 minutes.

EXAMPLES

A more detailed description of the present invention is presented below based on a series of examples and comparative examples, although the present invention is in no way limited by the examples described below.

Example 1

<Preparation of Composition>

60 parts by mass of a dimethylpolysiloxane with a viscosity at 25° C. of approximately 30,000 mPa·s and with both molecular chain terminals blocked with vinyldimethylsiloxy groups, 8 parts by mass of hexamethyldisiloxane, 2 parts by mass of water, and 40 parts by mass of a fumed silica with a specific surface area determined by the BET method of approximately 300 $m^2/g$ (product name: Aerosil (a registered trademark) 300, manufactured by Nippon Aerosil Co., Ltd.) were placed in a kneader and mixed together for one hour at room temperature, yielding a mixture. Subsequently, the mixture was heated to 150° C., and mixing was continued for a further two hours. Following subsequent cooling of the mixture to room temperature, 24 parts by mass of a dimethylpolysiloxane with a viscosity at 25° C. of approximately 30,000 mPa·s and with both molecular chain terminals blocked with vinyldimethylsiloxy groups, and 5 parts by mass of a dimethylpolysiloxane with a viscosity at 25° C. of approximately 700 mPa·s, having both molecular chain terminals blocked with trimethylsiloxy groups and containing 5 mol % of vinylmethylsiloxane units within the diorganosiloxane units of the principal chain were added, and mixing was continued until a uniform mixture was obtained, thus yielding a base compound (I).

To 64 parts by mass of this base compound (I) were added and mixed 8 parts by mass of a dimethylpolysiloxane with a viscosity at 25° C. of approximately 30,000 mPa·s, having both molecular chain terminals blocked with vinyldimethylsiloxy groups and containing 0.18 mol % of vinylmethylsiloxane units within the diorganosiloxane units of the principal chain, 23 parts by mass of a dimethylpolysiloxane with a viscosity at 25° C. of approximately 30,000 mPa·s and with both molecular chain terminals blocked with vinyldimethylsiloxy groups, 35 parts by mass of a dimethylpolysiloxane with a viscosity at 25° C. of approximately 100,000 mPa·s and with both molecular chain terminals blocked with vinyldimethylsiloxy groups, 3 parts by mass of a copolymer of dimethylsiloxane and methylhydrogensiloxane with a viscosity at 25° C. of 10 mPa·s, containing silicon atom-bonded hydrogen atoms as molecular side chains and with both molecular chain terminals blocked with trimethylsiloxy groups (silicon atom-bonded hydrogen atom content =0.82% by mass), 0.02 parts by mass of 1-ethynylcyclohexanol, 0.25 parts by mass of a dimethylpolysiloxane solution of a complex of chloroplatinic acid and 1,3-divinyltetramethyldisiloxane containing a platinum atom content of 1% by mass, 0.14 parts by mass of tetramethyltetravinylcyclotetrasiloxane, 0.7 parts by mass of γ-glycidoxypropyltrimethoxysilane, and 0.15 parts by mass of hydroxyaluminum bis(2-ethylhexanoate), thus completing preparation of a composition A.

<Gas Tightness Test>

This composition A was coated onto a woven air bag base fabric using a coater, using the minimum quantity of composition capable of forming a uniform coating with no coating irregularities (80 g/m$^2$), and the coated base fabric was then placed in an oven and heated at 170° C. for one minute to cure the coating, thus completing preparation of a woven air bag. A gas tightness test was conducted using this air bag. In this gas tightness test, the air bag was inflated with a pressure of 140 kPa, the residual pressure was measured after 30 seconds, and this residual pressure value was used to evaluate the gas tightness. The result is shown in Table 1.

Comparative Example 1

With the exception of replacing the 0.15 parts by mass of hydroxyaluminum bis(2-ethylhexanoate) from the example 1 with 0.15 parts by mass of aluminum tris(acetylacetonate), a composition B was prepared, and then subjected to a gas tightness test, in the same manner as the example 1. The result is shown in Table 1.

Comparative Example 2

With the exception of replacing the 0.15 parts by mass of hydroxyaluminum bis(2-ethylhexanoate) from the example 1 with 0.09 parts by mass of aluminum triisopropylate, a composition C was prepared, and then subjected to a gas tightness test, in the same manner as the example 1. The result is shown in Table 1.

Comparative Example 3

With the exception of replacing the 0.15 parts by mass of hydroxyaluminum bis(2-ethylhexanoate) from the example 1 with 0.1 parts by mass of diisopropoxyaluminum (acetylacetonate), a composition D was prepared, and then subjected to a gas tightness test, in the same manner as the example 1. The result is shown in Table 1.

TABLE 1

|  | Example 1 | Comparative example 1 | Comparative example 2 | Comparative example 3 |
|---|---|---|---|---|
| Gas tightness test Residual pressure (kPa) | 50 | 5 | 0 | 0 |

What is claimed is:

1. A liquid silicone rubber coating composition, comprising:
   (A) 100 parts by mass of at least one organopolysiloxane containing two or more alkenyl groups bonded to silicon atoms within each molecule,
   (B) at least one organohydrogenpolysiloxane containing at least two silicon atom-bonded hydrogen atoms within each molecule, in sufficient quantity that a number of silicon atom-bonded hydrogen atoms within the composition is within a range from 1 to 10 per silicon atom-bonded alkenyl group within the component (A), and a molar ratio of a number of silicon atom-bonded hydrogen atoms within the component (B) relative to a total number of silicon atom-bonded hydrogen atoms within the entire composition is within a range from 0.5 to 1,
   (C) an effective quantity of at least one addition reaction catalyst,
   (D) 0 to 50 parts by mass of at least one finely powdered silica with a specific surface area of at least 50 m$^2$/g,
   (E) 0.1 to 10 parts by mass of at least one organosilicon compound containing an epoxy group and a silicon atom-bonded alkoxy group within each molecule, and
   (F) 0.01 to 5 parts by mass of at least one organoaluminum compound represented by formula (3):

$$Al(OH)(OCOR)_2 \quad (3)$$

wherein
   each R independently represents an unsubstituted or substituted monovalent hydrocarbon group of 1 to 20 carbon atoms.

2. The composition according to claim 1, wherein the component (B) is a lone compound containing silicon atom-bonded hydrogen atoms within the composition, and a blend quantity of the component (B) is such that a number of silicon atom-bonded hydrogen atoms within the component (B) is within a range from 1 to 10 per silicon atom-bonded alkenyl group within the component (A).

3. The composition according to claim 1, which is used in a curtain air bag.

4. The composition according to claim 1, wherein the R groups represent identical or different alkyl groups of 1 to 20 carbon atoms.

5. The composition according to claim 1, wherein the component (F) is at least one compound selected from the group consisting of:

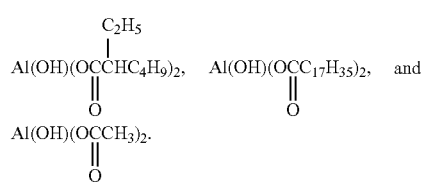

6. A cured product obtained by curing the composition according to claim 1.

7. A curtain air bag, comprising:
   a substrate of a fibrous fabric, and
   a silicone rubber coating layer formed from a cured product of the composition defined in claim 1, wherein the silicone rubber coating layer is formed on at least one surface of the substrate.

8. A method of producing a curtain air bag according to claim 7, comprising:
applying said composition to at least one surface of the substrate composed of a fibrous fabric, and
curing the composition, thereby forming a silicone rubber coating layer formed from a cured product of the composition on at least one surface of the substrate.

9. The composition according to claim 1, wherein component (A) is at least one organopolysiloxane represented by formula (1)

$$R^1{}_a SiO_{(4-a)/2} \quad (1)$$

wherein
each $R^1$ represents independently an unsubstituted or substituted monovalent hydrocarbon group of 1 to 10 carbon atoms, and
a represents a number within a range from 1.5 to 2.8,
provided that 0.001 to 10 mol % of all the $R^1$ groups are alkenyl groups.

10. The composition according to claim 1, wherein component (A) is at least one organopolysiloxane selected from the group consisting of a copolymer of dimethylsiloxane and methylvinylsiloxane with both molecular chain terminals blocked with trimethylsiloxy groups; a methylvinylpolysiloxane with both molecular chain terminals blocked with trimethylsiloxy groups; a copolymer of dimethylsiloxane, methylvinylsiloxane and methyiphenylsiloxane with both molecular chain terminals blocked with trimethylsiloxy groups; a dimethylpolysiloxane with both molecular chain terminals blocked with dimethylvinylsiloxy groups; a methylvinylpolysiloxane with both molecular chain terminals blocked with dimethylvinylsiloxy groups; a copolymers of dimethylsiloxane and methylvinylsiloxane with both molecular chain terminals blocked with dimethylvinylsiloxy groups; a copolymer of dimethylsiloxane, methylvinylsiloxane and methylphenylsiloxane with both molecular chain terminals blocked with dimethylvinylsiloxy groups; a dimethylpolysiloxane with both molecular chain terminals blocked with divinylmethylsiloxy groups; a copolymer of dimethylsiloxane and methylvinylsiloxane with both molecular chain terminals blocked with divinylmethylsiloxy groups; a dimethylpolysiloxane with both molecular chain terminals blocked with trivinylsiloxy groups; a copolymer of dimethylsiloxane and methylvinylsiloxane with both molecular chain terminals blocked with trivinylsiloxy groups; an organosiloxane copolymer having siloxane units represented by $R^2{}_3SiO_{0.5}$, siloxane units represented by $R^2{}_2R^3SiO_{0.5}$, siloxane units represented by $R^2{}_2SiO$, and siloxane units represented by $SiO_2$; an organosiloxane copolymer having siloxane units represented by $R^2{}_3SiO_{0.5}$, siloxane units represented by $R^2{}_2R^3SiO_{0.5}$, and siloxane units represented by $SiO_2$; an organosiloxane copolymer having siloxane units represented by $R^2{}_2R^3SiO_{0.5}$, siloxane units represented by $R^2{}_2SiO$, and siloxane units represented by $SiO_2$; and an organosiloxane copolymer having siloxane units represented by $R^2R^3SiO$, and siloxane units represented by $R^2SiO_{1.5}$ or siloxane units represented by $R^3SiO^{1.5}$, wherein
$R^2$ represent identical or different, unsubstituted or substituted monovalent hydrocarbon groups that contain no aliphatic unsaturated bonds and from 1 to 12 carbon atoms.

11. The composition according to claim 1, wherein said at least one organohydrogenpolysiloxane is represented by formula (2)

$$R^4{}_b H_c SiO_{(4-b-c)/2} \quad (2)$$

wherein,
each $R^4$ represents independently a saturated, unsubstituted or substituted, silicon atom-bonded monovalent hydrocarbon group having from 1 to 10 carbon atoms, and
b and c represent positive numbers that satisfy $0.7 \leq b \leq 2.1$, $0.001 \leq c \leq 1.0$ and $0.8 \leq b+c \leq 3.0$.

12. The composition according to claim 1, wherein said at least one organohydrogenpolysiloxane is at least one member selected from the group consisting of 1,1,3,3-tetramethyldisiloxane; 1,3,5,7-tetramethylcyclotetrasiloxane; tris(hydrogendimethylsiloxy)methylsilane; tris(hydrogendimethylsiloxy)phenylsilane; methylhydrogencyclopolysiloxane; a cyclic copolymer of methylhydrogensiloxane and dimethylsiloxane; a methylhydrogenpolysiloxane with both terminals blocked with trimethylsiloxy groups; a copolymer of dimethylsiloxane and methylhydrogensiloxane with both terminals blocked with trimethylsiloxy groups; a copolymer of dimethylsiloxane, methylhydrogensiloxane and methylphenylsiloxane with both terminals blocked with trimethylsiloxy groups; a copolymer of dimethylsiloxane, methylhydrogensiloxane and diphenylsiloxane with both terminals blocked with trimethylsiloxy groups; a methylhydrogenpolysiloxane with both terminals blocked with dimethylhydrogensiloxy groups; a dimethylpolysiloxane with both terminals blocked with dimethylhydrogensiloxy groups; a copolymer of dimethylsiloxane and methylhydrogensiloxane with both terminals blocked with dimethylhydrogensiloxy groups; a copolymer of dimethylsiloxane and methylphenylsiloxane with both terminals blocked with dimethylhydrogensiloxy groups; a copolymer of dimethylsiloxane and diphenylsiloxane with both terminals blocked with dimethylhydrogensiloxy groups; a methylphenylpolysiloxane with both terminals blocked with dimethylhydrogensiloxy groups; a diphenylpolysiloxane with both terminals blocked with dimethylhydrogensiloxy groups; an organohydrogenpolysiloxanes in which a portion of, or all of, the methyl groups in each of the above compounds have been substituted with other alkyl groups such as ethyl groups or propyl groups; an organosiloxane copolymer having siloxane units represented by $R^4{}_3SiO_{0.5}$, siloxane units represented by $R^4{}_2HSiO_{0.5}$, and siloxane units represented by $SiO_2$, an organosiloxane copolymer having siloxane units represented by $R^4{}_2HSiO_{0.5}$ and siloxane units represented by $SiO_2$; an organosiloxane copolymer having siloxane units represented by $R^4HSiO$ and siloxane units represented by either one of, or both, the formulas $R^4SiO_{1.5}$ and $HSiO_{1.5}$, wherein
$R^4$ represents identical or different, unsubstituted or substituted silicon atom-bonded monovalent hydrocarbon groups that contain no aliphatic unsaturated bonds and from 1 to 10 carbon atoms.

13. The composition according to claim 1, wherein the component (B) is a lone compound containing silicon atom-bonded hydrogen atoms within the composition, and a blend quantity of the component (B) is such that a number of silicon atom-bonded hydrogen atoms within the component (B) is within a range from 1 to 5 per silicon atom-bonded alkenyl group within the component (A).

14. The composition according to claim 1, wherein said at least one addition reaction catalyst comprises at least one member selected from the group consisting of platinum, palladium, rhodium, chloroplatinic acid, an alcohol-modified chloroplatinic acid, a coordination compound of chloroplatinic acid with an olefin, a vinylsiloxane compound, an acetylene compound, tetrakis(triphenylphosphine)palladium, and chlorotris-(triphenylphosphine)rhodium.

15. The composition according to claim 1, wherein said at least one addition reaction catalyst is present in an amount of from 1 to 500 ppm relative to the total mass of components (A) and (B).

16. The composition according to claim 1, wherein said at least one organosilicon compound is at least one selected from the group consisting of

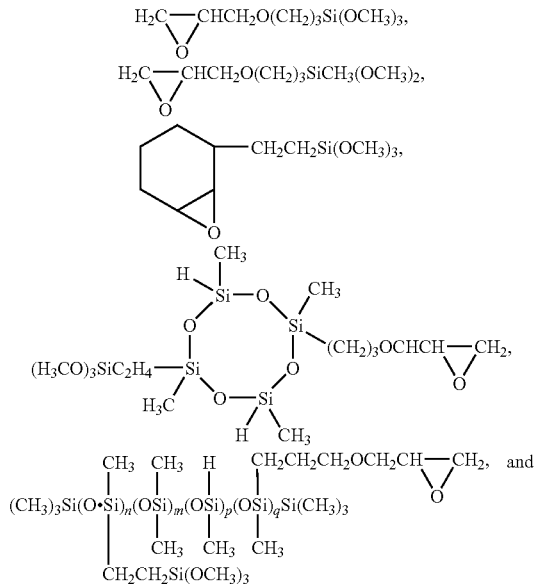

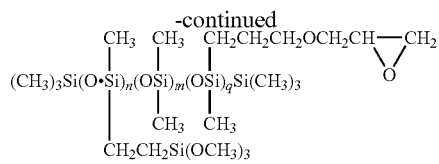

wherein n is an integer from 1 to 10, m is an integer from 0 to 100, p is an integer from 1 to 100, and q is an integer from 1 to 10.

17. The composition according to claim 1, wherein each R group independently represents an alkyl group selected from the group consisting of a methyl group, an ethyl group, a propyl group, an isopropyl group, a butyl group, an isobutyl group, a tert-butyl group, a pentyl group, a hexyl group, a cyclohexyl group, a heptyl group, a 1-ethylpentyl group, an octyl group, a 2-ethylhexyl group, a nonyl group, a decyl group, a dodecyl group, a heptadecyl group, and a stearyl group.

18. The composition according to claim 1, wherein said at least one organoaluminum compound is present in an amount of from 0.1 to 2 to parts by mass per 100 parts by mass of said at least one organopolysiloxane.

* * * * *